United States Patent [19]

Hawk

[11] 4,088,386
[45] May 9, 1978

[54] OPTICAL WAVEGUIDE CONNECTOR USING RESILIENT MATERIAL AND V-GROOVE

[75] Inventor: Robert M. Hawk, Bath, N.Y.

[73] Assignee: Corning Glass Works, Corning, N.Y.

[21] Appl. No.: 718,431

[22] Filed: Aug. 30, 1976

Related U.S. Application Data

[63] Continuation of Ser. No. 498,329, Aug. 19, 1974, abandoned.

[51] Int. Cl.² ............................................. G02B 5/14
[52] U.S. Cl. ................................................ 350/96.21
[58] Field of Search ............... 350/96 C, 96 R, 96 B, 350/96 WG

[56] References Cited

U.S. PATENT DOCUMENTS

3,864,018  2/1975  Miller ............................ 350/96 C

OTHER PUBLICATIONS

Someda, "Simple, Low-Loss . . . Fibers", BSTJ, vol. 52, No. 4, Apr. 1973, pp. 583–596.

Primary Examiner—Jon W. Henry
Attorney, Agent, or Firm—William J. Simmons, Jr.; Walter S. Zebrowski; Clarence R. Patty, Jr.

[57] ABSTRACT

An optical fiber connector comprising a first resilient member having an elongated V-shaped groove in the surface thereof into which two fibers to be optically connected are disposed end-to-end. A second resilient member is urged against that portion of the fibers opposite the first member, thereby causing a slight deformation of the second member and the slot-forming walls. The substantial equilibrium of forces applied to the two fibers by the resilient members causes their axes to become aligned. The preferred embodiment is capable of connecting corresponding fibers of two bundles and also includes means for positioning the endfaces of the fibers of one bundle in virtual contact with the endfaces of the fibers of the other bundle.

19 Claims, 7 Drawing Figures

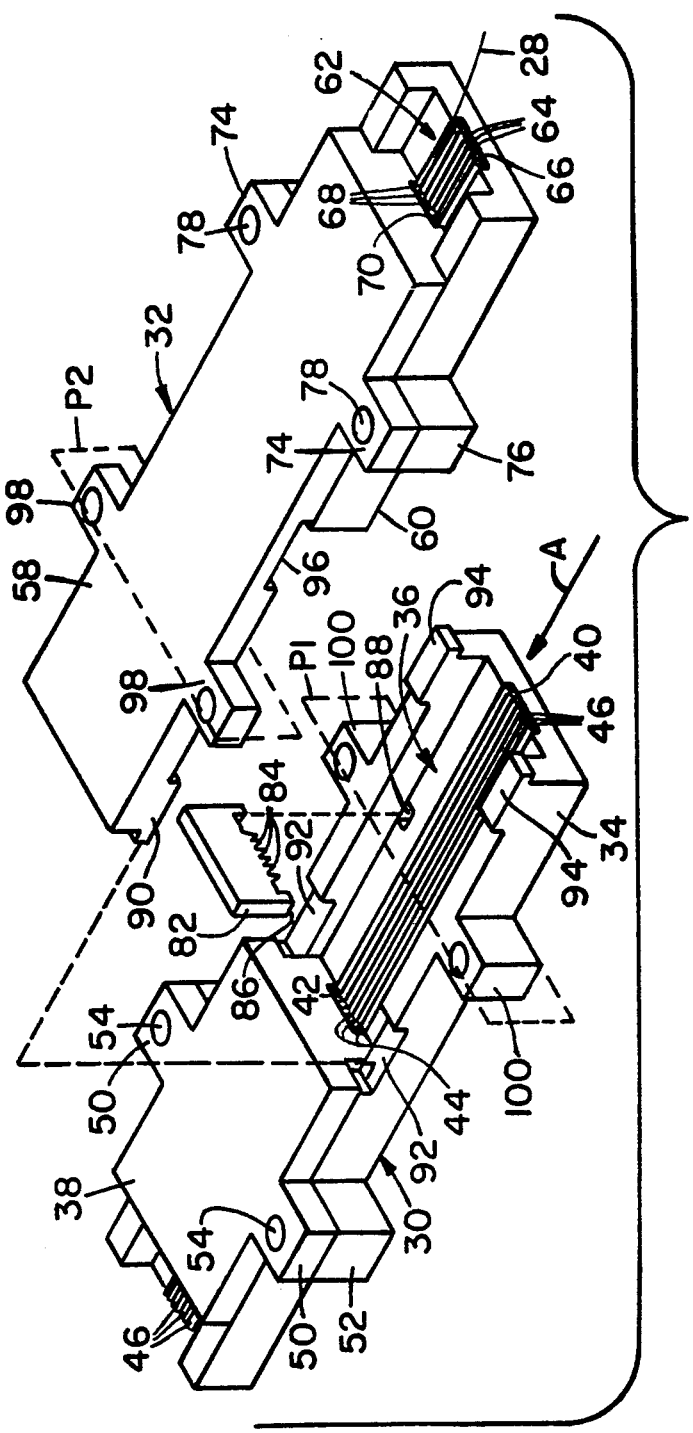
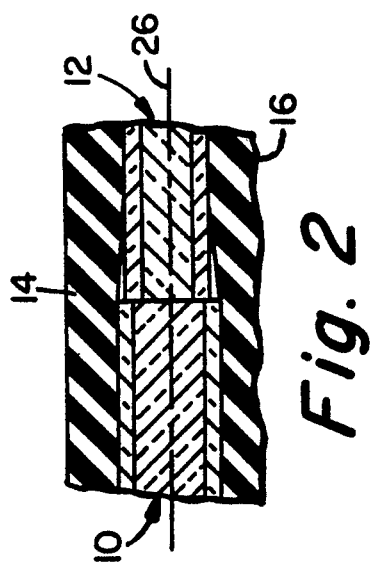
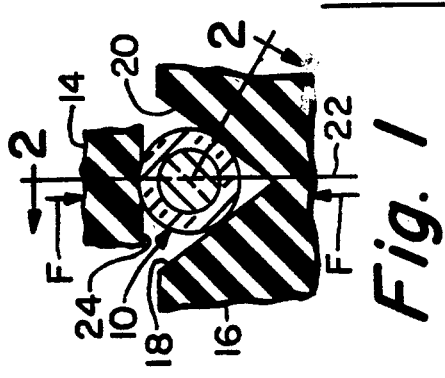

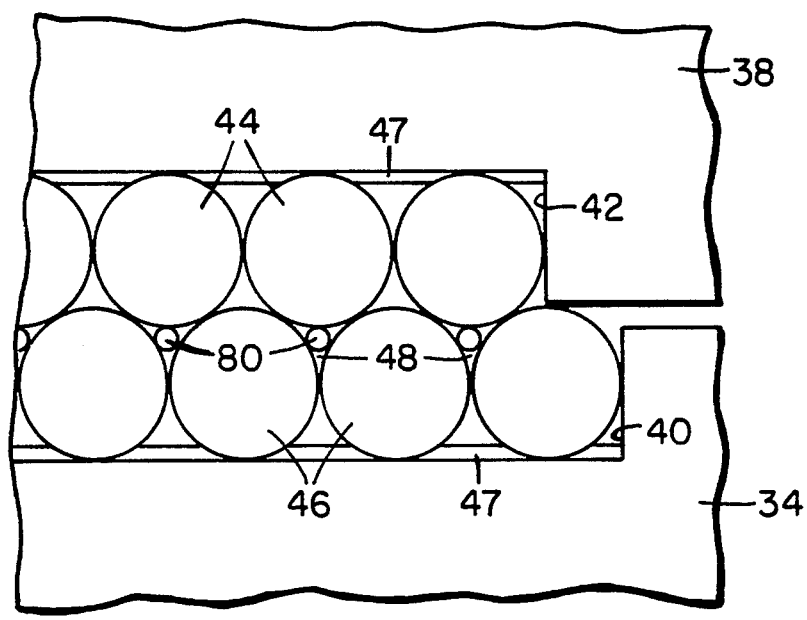
Fig. 4
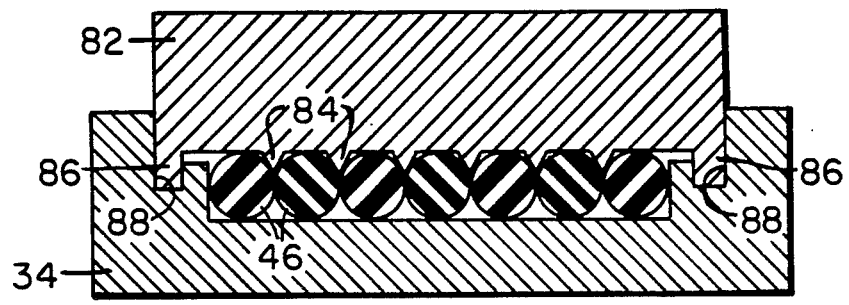
Fig. 6
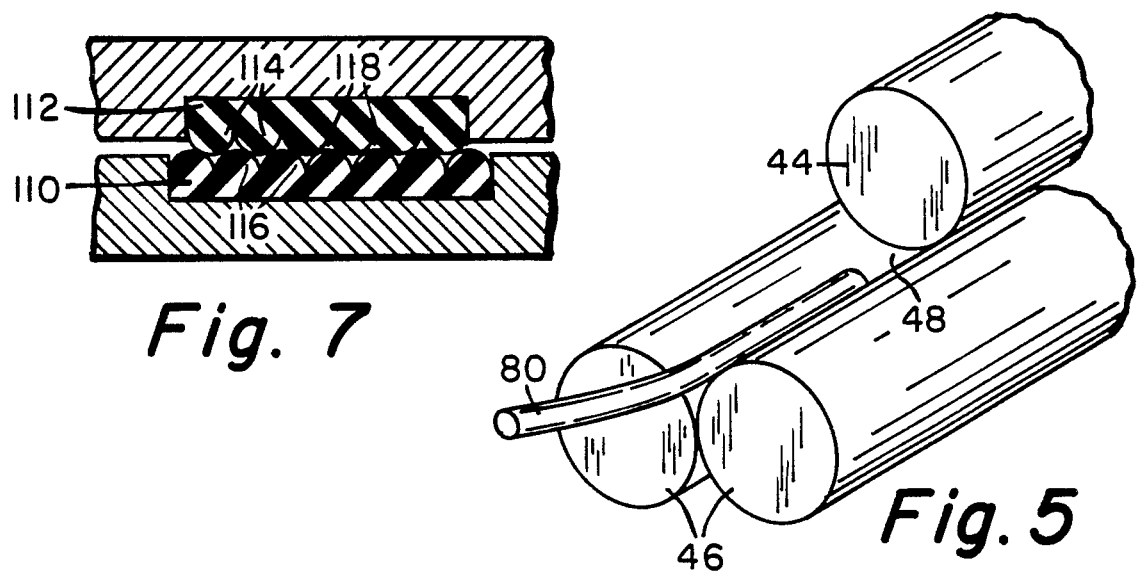
Fig. 7
Fig. 5

OPTICAL WAVEGUIDE CONNECTOR USING RESILIENT MATERIAL AND V-GROOVE

This is a continuation of application Ser. No. 498,329, filed Aug. 19, 1974 now abandoned.

BACKGROUND OF THE INVENTION

Recent advances in the fabrication of ultratransparent materials have demonstrated that fibers are a promising transmission medium for optical communication systems. These liqht transmitting fibers, which are referred to as optical waveguides generally consist of a transparent core surrounded by a layer of transparent cladding material having a refractive index which is lower than that of the core. A low loss optical waveguide and a method of making the same are disclosed in U.S. Pat. No. 3,659,915. The waveguide described in that patent comprises a cladding layer of fused silica and a core of fused silica doped with one or more materials that selectively increase the index of refraction of the core above that of the cladding.

If such fibers are to be used in optical communication systems, means must be provided for quickly and conveniently connecting sections of fiber together in the course of their use. Such means must cause light to be coupled from one fiber to another with little loss of signal, i.e., with low insertion loss. When two optical waveguides are joined end-to-end, insertion loss can result from center-to-center mismatch, angular misalignment of the fiber axes, fiber-to-fiber separation, rough end finish and Fresnel reflections. For example, consider the insertion loss which may occur when two fused silica optical waveguides of the type disclosed in the aforementioned U.S. Pat. No. 3,659,915 are joined end-to-end. For this illustration, it is assumed that the fibers have a diameter of 5 mils and a cladding thickness of 1 mil. If misregistration of the centers of the two fibers is the only loss mechanism, a loss of about 1 db occurs if the centers thereof are separated by 0.5 mil. For reasonably low insertion losses to be achieved, the centers of the fiber endfaces must therefore be registered within 0.5 mil. Furthermore, due to the low numerical aperture of present optical waveguides, the fiber axes must be substantially aligned, i.e., they must be aligned to within 3° to keep insertion losses less than about 1 db, assuming no other loss mechanisms are operative. Since light diverges from the fiber axis aas it radiates from a fiber, some light is lost if the endfaces of the two fibers are separated; therefore, the endfaces of the fibers should be maintained in virtual contact. Fiber-to-fiber separation also implies an insertion loss due to Fresnel reflections at the two glass-air interfaces. For the aforementioned fused silica optical waveguides, this amounts to 0.15 db per interface. This loss, however, can be substantially eliminated by disposing between the fiber endfaces a layer of index matching such as an oil or other fluid having a refractive index of about 1.5.

Minimizing these insertion losses becomes especially difficult when bundles of fibers are to be connected. The axes of all fibers in both bundles should be substantially parallel, the endfaces of the fibers in one bundle should be virtually touching the endfaces of the fibers in the other bundle, and index matching fluid should be disposed between the ends of the fibers in the two bundles. Finally, the endface of a fiber in one bundle should be substantially centered with respect to that of a corresponding fiber in the other bundle. A particularly important feature of the present invention concerns this latter requirement.

SUMMARY OF THE INVENTION

It is therefore an object of the present invention to provide a low loss in-line connector for use between two optical waveguide bundles.

Another object is to provide a device for connecting optical fibers in a mechanically sound and optically efficient manner.

A further object is to provide means for quickly and conveniently making an optical connection between two optical fibers.

Still another object of this invention is to provide a connector which automatically aligns the axes of two optical fibers while making an optical connection therebetween.

Briefly, the connector of the present invention comprises a first member of resilient material having at least one elongated V-shaped groove in a surface thereof for receiving a pair of fibers to be connected, the two walls forming the V-shaped groove being substantially symmetrical about a first plane and the axes of the pair of fibers being disposed in the first plane. A second member of resilient material having at least one elongated elevated portion is aligned with the groove and is adapted to contact that surface of the fibers opposite the groove. Means are provided for applying a force to the first and second members which tends to bring them together and deform them against the adjacent surfaces of the fibers, thereby simultaneously aligning and mechanically securing the fibers.

BRIEF DESCRIPTION OF THE DRAWINGS

FIGS. 1 and 2 illustrate a basic optical fiber connector constructed in accordance with the present invention.

FIG. 2 is a cross-sectional view taken along lines 2—2 and extending to the center of the optical fiber illustrated in FIG. 1.

FIG. 3 is an exploded, oblique view of a preferred embodiment of the present invention.

FIG. 4 is a partial end view as viewed from the direction of arrow A of FIG. 3.

FIG. 5 is an oblique view which illustrates one feature of the present invention.

FIG. 6 is a cross-sectional view illustrating the function of a temporarily utilized optical fiber.

FIG. 7 is a cross-sectional view illustrating a modification of the resilient, fiber-retaining rods.

DESCRIPTION OF THE PREFERRED EMBODIMENTS

The basic principle of the present invention is illustrated in FIGS. 1 and 2 wherein two cylindrically shaped optical fibers 10 and 12 are supported between alignment members 14 and 16 of resilient material such as rubber, plastic or the like. Member 16 has an elongated V-shaped groove formed by two walls 18 and 20 which are symmetrically disposed about a plane represented by broken line 22. The connector of the present invention functions to secure the fibers to be connected and to align the axes thereof by engaging the fibers along three portions of their cylindrical sidewalls, i.e., both fibers are secured between walls 18 and 20 of member 16 and surface 24 of member 14. The shape of walls 18 and 20 and surface 24 can be flat, convex or the like so long as these three fiber supporting surfaces function in the manner hereinafter described to achieve low loss coupling of light between fibers.

If cylindrical fibers 10 and 12 were merely placed end-to-end in the groove defined by walls 18 and 20, their axes would be in plane 22 even if their diameters were not equal. It has been found that the axes of the two abutting fibers can be substantially aligned by applying a force, which is represented by arrows F, to members 14 and 16. Force F tends to bring members 14 and 16 together, thereby causing these members to deform against the surfaces of fibers 10 and 12 and also causing the fiber axes to move in plane 22 until they are substantially aligned along a common axis 26 as shown in FIG. 2.

In a preferred embodiment illustrated in FIG. 3, the connector comprises first and second housings 30 and 32, each housing being adapted to receive the fibers from a corresponding optical waveguide bundle or cable. After the fibers are properly disposed and retained within the two housings, the housings are brought together in such a manner as to accurately align corresponding fibers of the two bundles and to afford a secure optical connection between corresponding fibers.

Housing 30 consists of an elongated member 34 of U-shaped cross-section having a channel 36 therein and a shorter member 38, a portion of which is disposed in channel 36. A slot 40, which extends the length of channel 36, is disposed adjacent to a channel 42, which extends the length of member 38. A plurality of resilient rods 44, which are equal in number to the number of fibers in each bundle, are disposed in slot 42 and extend the length thereof. A plurality of resilient rods 46, which are one greater in number than the number of rods 44, are disposed in slot 40 and extend the length thereof. As shown in FIG. 4 each rod 44 contacts two rods 46 and forms therewith an optical waveguide receiving aperture 48. Rods 44 and 46 are secured in their respective channels by bonding material 47 which may consist of glue, epoxy or the like. A pair of tabs 50 protruding from opposite sides of member 38 are aligned with a pair of tabs 52 protruding from member 34. Bolts 54 extending through tabs 50 are threaded into tabs 52. The diameters of rods 44 and 46 are such that members 34 and 38 remain slightly separated. By urging members 34 and 38 toward each other, such as by tightening bolts 54, resilient rods 44 and 46 are deformed. Although member 38, which is much shorter than member 34, is disposed toward one end of member 34, it is spaced a sufficient length from the end of member 34 to expose a short length of rods 46. Only the endfaces of rods 44 are exposed.

Housing 32 similarly comprises two cooperating members 58 and 60. However, housing 32 differs from housing 30 in that it is the shorter member 60 which is U-shaped and contains a channel 62. A plurality of resilient rods 64 equal in number to rods 46 are disposed in a slot 66 which is disposed in channel 62 and extends the length thereof. A plurality of rods 68 equal in number to rods 44 are disposed in a slot 70 which extends the length of member 58. Since slots 66 and 70 are disposed adjacent to one another, rods 64 and 68 cooperate to form fiber receiving apertures similar to apertures 48 which are formed within housing 30. For facilitating the insertion of optical fibers, member 60, which is substantially shorter than member 58, extends beyond one end of member 58 to expose a short length of rods 64. A pair of tabs 74, disposed on opposite sides of member 58, are aligned with a pair of tabs 76 which are disposed on opposite sides of member 60. A pair of bolts 78 extend through holes in tabs 74 and are threaded in tabs 76. Member 58 is slightly spaced from member 60, and this spacing may be decreased by tightening bolts 78, thereby deforming rods 64 and 68.

To make a connection between fibers of first and second bundles, the fibers of the first bundle are inserted through apertures 48 and along the grooves formed by adjacent fibers 46 until they reach a position about half way down the exposed lengths of rods 46. Since rods 46 extend beyond rods 44, the insertion of a waveguide fiber into a corresponding aperture 48 is facilitated by placing the fiber in the groove formed by two adjacent rods 46 and sliding the fiber in that groove toward aperture 48. This fiber insertion procedure is illustrated in FIG. 5 wherein a waveguide fiber 80 is illustrated as having the end thereof in the groove between fibers 46 and not quite having reached aperture 48.

To facilitate the disposition of the fiber end-faces at the proper position along the exposed portions of rods 46, an alignment member 82 can be temporarily disposed across rods 46 to prevent further movement of the waveguide fibers after the endfaces thereof have reached their desired position. In FIG. 3, this position is plane P1 which is represented by dashed lines. As more clearly illustrated in FIG. 6, which is a cross-sectional view of member 82 disposed in its temporary alignment position, that member may include projections 84 which extend into the grooves between adjacent rods 46 to intercept the waveguide fibers. To correctly locate alignment member 82, tabs 86 located at opposite ends thereof are inserted into slots 88 in channel 36. After the waveguide fibers are properly inserted into housing 30 with the endfaces thereof lying in plane P1, a force is applied to members 34 and 38 to cause resilient rods 44 and 46 to deform and apply a retaining force against the surfaces of waveguide fibers 80. Members 34 and 38 may be urged toward each other by tightening bolts 54.

In a similar manner, the optical waveguide fibers of a second bundle are inserted into the apertures between rods 64 and 68 of housing 32. For the sake of clarity only one of the fibers 28 of the second bundle is illustrated in FIG. 3 as extending into an aperture between three adjacent alignment rods. An alignment member similar to member 82 can be disposed along rods 68 to prevent the fibers of the second bundle from extending beyond a plane P2 which is illustrated by dashed lines. After a retaining force is applied to the fibers, such as by tightening bolts 78, the alignment member is removed.

During the handling of optical waveguide fibers, and especially during the insertion thereof through apertures 48 the endfaces thereof may become contaminated. At this point in the process of connecting the two bundles, the fiber endfaces, which are exposed and readily accessible, can be cleaned. Thereafter, index matching fluid can be applied to the fiber endfaces.

Housings 30 and 32 are then brought together so that stepped lugs 90 and 94 extend into slots 92 and 96, respectively. When the two housings are joined in this manner, resilient rods 68, which extend to that end of member 58 from which lugs 90 protrude, cooperate with rods 46 to form fiber receiving apertures similar to apertures 48 which are illustrated in FIG. 4. At this time during the connection of the two housings, the end portions of the optical waveguides of the first and second bundles extend within the apertures formed between rods 46 and 68. Stepped lugs 90 and 94 are shorter than the slots into which they are inserted, thereby permitting a slight separation to initially exist between the endfaces of the waveguide fibers of the first and second bundles. Housings 30 and 32 are then moved in a direction parallel to the axes of the resilient rods so that the stepped portions of lugs 90 and 94 move into the recesses of slots 92 and 96, respectively. This movement causes planes P1 and P2 to coincide so that the endfaces of the fibers of the first bundle are urged against the endfaces of corresponding fibers of the second bundle. These recessed slots and stepped lugs thus function as means for positoning the endfaces of the fibers of one bundle in virtual contact with the endfaces of the fibers of the other bundle. A slight separation may exist between the stepped portion of the lugs and the ends of the recesses into which they are inserted and between the adjacent ends of members 38 and 58 to ensure that the waveguide endfaces touch. It is noted that the fibers slide along the resilient rods only a very short distance during the connection of the two housings, thereby preventing contamination of the fiber endfaces. Tabs 98 of member 58 are then disposed adjacent to tabs 100 of member 34, and housing 30 can be secured to housing 32 by inserting bolts (not shown) through the holes in tabs 98 and threading them into tabs 100. As member 58 is drawn toward member 34, a clamping force is applied to the resilient rods normal to the planes of the rod arrays, thereby causing the rods to bear against the waveguide fibers. This causes a deformation of the alignment rods in that portion of the connector formed by overlapping sections of housings 34 and 58 which includes the region of each fiber-to-fiber joint at coincident planes P1 and P2. The axis of each fiber of the first bundle is thereby caused to become substantially aligned with the axis of corresponding fiber of the second bundle in the manner described in conjunction with FIGS. 1 and 2, a rod 68 performing the function of member 14 and two adjacent rods 46 cooperating to define a V-shaped slot the function of which is identical to that formed by walls 18 and 20 of member 16. This optical connection of fibers may be broken and re-made numerous times without removing the fibers from the housings, and thus can perform the function of a multifiber, multichannel optical cable connector.

After housings 30 and 32 are secured together, the component parts thereof can be analyzed in terms of the basic connector illustrated in FIGS. 1 and 2. The resilient rods 46 and 64 constitute a first resilient member having V-shaped grooves in a surface thereof, rods 46 being a first section and rods 64 being a second section of that member. Similarly, resilient rods 44 and 68 constitute a second member having elongated, elevated portions which are aligned with the grooves and form therewith fiber receiving apertures, rods 44 being a first section and rods 64 being a second section. Both ends of the first member extend beyond the corresponding ends of the second member to expose the grooves. Rods 46, the first section of the first member, extend a given length beyond rods 44, the first section of the second member. Rods 68, the second section of the second member extend beyond rods 64, the second section of the first member, for a length equal to said given length. The given length of rods 46 are aligned with the corresponding extending portion of rods 68. The ends of the connected optical fibers are disposed on these overlapping portions of the first section of the first member and the second section of the second member.

Although all of the apertures formed by rods 44 and 46 are capable of retaining and aligning waveguide fibers, only about one-half of these apertures are so employed in the preferred embodiment. One reason for this is the difficulty which would be encountered in attempting to insert fibers in the unused apertures. Whereas fibers are easily inserted into the lower apertures of FIG. 4 by utilizing the groove between adjacent extending rods 46 (see FIG. 5), no similar groove would be available to facilitate the insertion of fibers in the unused apertures. Furthermore, a substantially complete isolation from cross-talk between fibers is afforded by the rods, even in the event that the rods may not be in intimate contact with each other.

Whereas linear arrays of resilient rods have been illustrated in the preferred embodiment, curved arrays could also be employed. For example, the bottom of slot 40 could have a convex curvature, and the bottom of slot 42 could have a concave curvature. Furthermore, as illustrated in FIG. 7, each array of alignment rods may be replaced by a single alignment member such as members 110 and 112. Alignment member 112 contains a plurality of parallel rounded ridges 114 equal in number to the number of fibers in each bundle. Each of the ridges 114 is disposed between a pair of ridges 116 of member 110 to form a waveguide fiber receiving aperture 118.

I claim:

1. An optical fiber connector comprising a first member of resilient material having a plurality of elongated V-shaped grooves in a surface thereof, each of said grooves being adapted to receive a pair of fibers, one from each of a pair of fiber cables that are to be connected, the two walls forming each of said V-shaped grooves being substantially symmetrical about a plane, the axes of said pair of fibers being disposed in the plane of the groove in which they are disposed, that portion of said grooves at which said walls intersect remaining free from contact with said fibers, a second member of resilient material having a plurality of elongated elevated portions aligned with said grooves and forming therewith a plurality of apertures which are adapted to receive said fibers, said second member being adapted to contact that surface of said fibers opposite said grooves, the two walls of said grooves and said second member contacting each of said fibers at three noncontiguous surface areas, said first and second members each having first and second sections which are secured together in abutting relationship, a given length of the first section of said first member extending beyond the first section of said second member, the second section of said second member extending beyond the second section of said first member a distance equal to said given length, and means for securing together said first section of said first member and said second section of said second member so that the given length of said first section of said first member becomes aligned with the corresponding extending portion of said second member, said optical fibers being adapted to be connected along the overlapping portions of said first and second members, and means or applying a force to said first and second members in a direction perpendicular to said axes and in said plane, said force tending to bring said members together and causing said members to deform against the adjacent surfaces of said fibers, thereby simultaneously aligning and mechanically securing said fibers.

2. An optical fiber connector in accordance with claim 1 further comprising means for facilitating longitudinal movement between the overlapping portions of said first and second members.

3. An optical fiber connector in accordance with claim 2 wherein the endfaces of the optical fibers of the first and second bundles substantially lie in a single plane that is perpendicular to said grooves.

4. An optical fiber connector in accordance with claim 3 wherein the walls forming said V-shaped grooves of said first member and said elevated portions of said second member are circularly shaped.

5. An optical fiber connector comprising
a first member of resilient material having at least one elongated V-shaped groove in a surface thereof for receiving a pair of fibers to be connected, the two walls forming said V-shaped groove being substantially symmetrical about a first plane, the axes of said pair of fibers being disposed in said first plane, that portion of said groove at which said walls intersect remaining free from contact with said fibers, the two walls which form said V-shaped groove being sections of two contacting cylinders of resilient material,
a second member of resilient material having at least one elongated elevated portion aligned with said groove and forming therewith an aperture which is adapted to receive said fibers, said second member also being adapted to contact that surface of said fibers opposite said groove, said second member being a cylinder the center of which lies in said first plane, and
means for applying a force to said first and second members in a direction perpendicular to said axes and in said first plane, said force tending to bring said members together and causing said members to deform against the adjacent surfaces of said fibers, thereby simultaneously aligning and mechanically securing said fibers.

6. An optical fiber connector comprising
a first member of resilient material having at least one elongated V-Shaped groove in a surface thereof for receiving a pair of fibers to be connected, the two walls forming said V-shaped groove being substantially symmetrical about a first plane, the axes of said pair of fibers being disposed in said first plane, that portion of said groove at which said walls intersect remaining free from contact with said fibers, the walls of said V-shaped groove being convexly shaped,
a second member of resilient material having at least one elongated elevated portion aligned with said groove and forming therewith an aperture which is adapted to receive said fibers, that part of said elevated portion which contacts said fibers being circular in cross section and being symmetrical with respect to said first plane, said second member being adapted to contact that surface of said fibers opposite said groove, and
means for applying a force to said first and second members in a direction perpendicular to said axes and in said first plane, said force tending to bring said members together and causing said members to deform against the adjacent surfaces of said fibers, thereby simultaneously aligning and mechanically securing said fibers.

7. An optical fiber connector comprising
a first member of resilient material having a plurality of elongated V-shaped grooves in a surface thereof, each of said grooves being adapted to receive a pair of fibers, one from each of a pair of fiber cables that are to be connected, the two walls forming each of said V-shaped grooves being substantially symmetrical about a plane, the axes of said pair of fibers being disposed in the plane of the groove in which they are disposed,
a second member of resilient material having a plurality of elongated elevated portions each elevated portion being aligned with one of said grooves and forming therewith an aperture which is adapted to receive said pair of fibers, said second member being adapted to contact that surface of said pair of fibers opposite said groove, said first and second members each comprising first and second sections which are secured together in abutting relationship, a given length of the first section of said first member extending beyond the first section of said second member, the second section of said second member extending beyond the second section of said first member a distance equal to said given length, and means for securing together said first section of said first member and said second section of said second member so that the given length of said first section member becomes aligned with the corresponding extending portion of said second member, said pair of fibers being adapted to be connected along the overlapping portions of sad first and second members, and
means for applying a force to said first and second members in a direction perpendicular to said axes and in the planes of said grooves, said force tending to bring said members together and causing said members to deform against the adjacent surfaces of each pair of fibers, thereby simultaneously aligning and mechanically securing each pair of fibers.

8. An optical fiber connector capable of securing in axial alignment corresponding fibers having substantially circular cross sections from first and second fiber cables even if said corresponding fibers have different diameters, said connector comprising
a first housing having a first member of resilient material in which are disposed a plurality of parallel, V-shaped grooves having a circularly shaped cross-section, the two walls forming each of said V-shaped grooves being convexly shaped and substantially symmetrical about a plane, the fibers from said first cable being adapted to be disposed in said grooves, the ends of said fibers being adapted to be disposed in a substantially planar array a given distance from a first end of said first member
a second housing having a second member of resilient material in which there are disposed a plurality of parallel, elongated, elevated portions having the same spacing as said V-shaped grooves, that part of each of said elevated portions which contacts said fibers being circular in cross section and being symmetrical with respect to said planes of symmetry,
means for securing each of the fibers from said second cable so that the end portion of each fiber is adapted to extend along a corresponding one of said elevated portions, the ends of said fibers of said second cable being adapted to be disposed in a substantially planar array, and means for securing together said first and second housings with such an orientation that each of the fibers of said second cable is adapted to be disposed in a groove of said first housing with the endface thereof adapted to be adjacent to the endface of the corresponding fiber of said first cable, said means for securing applying a force to said first member of said first housing and to said second member of said second housing, said force being adapted to be applied in a direction perpendicular to the axes of said fibers and in a direction parallel to the planes about which said groove forming walls are symmetrical, said force tending to bring said members of said first and second housings together and being adapted to cause said members to deform against the adjacent surfaces of said fibers, thereby simultaneously aligning and mechanically securing said fibers.

9. An optical fiber connector capable of securing in axial alignment corresponding fibers having substantially circular cross sections from first and second fiber cables even if said corresponding fibers have different diameters, said connector comprising a first housing having a first member of resilient material in which a plurality of parallel, V-shaped grooves are disposed, the two walls forming each of said V-shaped grooves being substantially symmetrical about a plane, said walls intersecting at an angle less than 180°, the fibers from said first cable being adapted to be disposed in said grooves, the ends of said fibers being adapted to be disposed in a substantially planar array a given distance from a first end of said first member, a second housing having a second member of resilient material in which there are disposed a plurality of parallel, elongated, elevated portions having the same spacing as said V-shaped grooves, means for securing each of the fibers from said second cable so that the end portion of each fiber is adapted to extend along a corresponding one of said elevated portions, the ends of said fibers of said second cable being adapted to be disposed in a planar array, and means for securing together said first and second housings with such an orientation that each of the fibers of said second cable is adapted to be disposed in a groove of said first housing with the endface thereof adapted to be ajacent to the endface of the corresponding fiber of said first cable, said means for securing applying a force to said first member of said first housing and to said second member of said second housing, said force being adapted to be applied in a direction perpendicular to the axes of said fibers and in a direction parallel to the planes about which said groove forming walls are symmetrical, said force tending to bring said members of said first and second housings together and being adapted to cause said members to deform against the adjacent surfaces of said fibers, thereby simultaneously aligning along a common axis and mechanically securing said fibers.

10. An optical fiber connector comprising a pair of fibers that are to be connected, said fibers being substantially circular in cross section, a first member of resilient material having at least one V-shaped groove in a surface thereof, said groove having two sidewalls that intersect at an angle less than 180°, said two sidewalls being substantially symmetrical about a plane, said pair of fibers being disposed in said groove with the axes thereof being disposed in said plane, that portion of said groove at which said walls intersect remaining free from contact with said fibers, a second member of resilient material having a surface which contacts that surface of said fibers opposite said groove, the two walls of said groove and said second member contacting each of said fibers at three noncontiguous surface areas, and means for applying a force to said first and second members in a direction perpendicular to said axes and in said first plane, said force tending to bring said members together and causing said members to deform against the adjacent surfaces of said fibers, thereby simultaneously aligning along a common axis and mechanically securing said fibers.

11. A connector in accordance with claim 10 wherein said first member has a plurality of parallel grooves for receiving the fibers of a pair of fiber cables, and said second member has a plurality of parallel elevated portions aligned with said grooves.

12. A connector in accordance with claim 10 wherein the surface of said second member is flat.

13. A connector in accordance with claim 10 wherein the surface of said second member has at least one elongated elevated portion aligned with said groove and forming therewith an aperture which receives said fibers.

14. An optical fiber connector in accordance with claim 13 wherein the depth of said V-shaped groove is greater than the diameter of said fibers.

15. An optical fiber connector capable of aligning a pair of fibers having substantially circular cross sections even if the diameters thereof are not equal, said connector comprising a first member of resilient material having at least one elongated V-shaped groove in a surface thereof for receiving a pair of fibers to be connected, the two walls forming said V-shaped groove being substantially symmetrical about a first plane, the axes of said pair of fibers being adapted to be disposed in said first plane, said walls intersecting in said first plane, the intersection of said walls occurring at an angle less than 180°, that portion of said groove at which said walls intersect being adapted to remain free from contact with said fibers, a second member of resilient material having a surface which is adapted to contact that surface of said fibers opposite said groove, the two walls of said groove and said second member being adapted to contact each of said fibers at three noncontiguous surface areas, and means for applying a force to said first and second members in a direction perpendicular to said axes and in said first plane, said force being adapted to bring said members together and causing said members to deform against the adjacent surfaces of said fibers, thereby simultaneously aligning along a common axis and mechanically securing said fibers.

16. A connector in accordance with claim 15 wherein said first member has a plurality of parallel grooves for receiving the fibers of a pair of fiber cables, and said second member has a plurality of parallel elevated portions aligned with said grooves.

17. A connector in accordance with claim 16 wherein said first member extends beyond said second member so that the end portions of each of said grooves are exposed, thereby facilitating the insertion of optical fibers in the apertures formed between said grooves and said elevated portions.

18. A connector in accordance with claim 15 wherein the surface of said second member is flat.

19. A connector in accordance with claim 15 wherein the surface of said second member has at least one elongated elevated portion aligned with said groove and forming therewith an aperture which is adapted to receive said fibers.

* * * * *